United States Patent
Mizuno et al.

(10) Patent No.: US 12,283,429 B2
(45) Date of Patent: Apr. 22, 2025

(54) DIELECTRIC CERAMIC AND MULTILAYER CERAMIC CAPACITOR

(71) Applicant: Murata Manufacturing Co., Ltd., Nagaokakyo (JP)

(72) Inventors: Taku Mizuno, Nagaokakyo (JP); Keisuke Araki, Nagaokakyo (JP); Hiroyuki Wada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 785 days.

(21) Appl. No.: 17/496,044

(22) Filed: Oct. 7, 2021

(65) Prior Publication Data
US 2022/0130608 A1    Apr. 28, 2022

(30) Foreign Application Priority Data
Oct. 27, 2020  (JP) .................... 2020-179755

(51) Int. Cl.
- *H01G 4/12* (2006.01)
- *C04B 35/46* (2006.01)
- *C04B 35/468* (2006.01)
- *H01G 4/30* (2006.01)

(52) U.S. Cl.
CPC ....... *H01G 4/1227* (2013.01); *C04B 35/4682* (2013.01); *H01G 4/30* (2013.01); *C04B 2235/3224* (2013.01); *C04B 2235/3236* (2013.01); *C04B 2235/3418* (2013.01); *C04B 2235/442* (2013.01); *C04B 2235/75* (2013.01)

(58) Field of Classification Search
CPC ........ H01G 4/1227; H01G 4/12; H01G 4/012; H01G 4/30; C04B 35/4682; C04B 2235/3224; C04B 2235/3236; C04B 2235/75
USPC .................... 361/301.4, 311, 321.1, 321.4
See application file for complete search history.

(56) References Cited

U.S. PATENT DOCUMENTS

| | | | | |
|---|---|---|---|---|
| 8,450,230 | B2 * | 5/2013 | Tamura | H01G 4/30 428/701 |
| 2008/0226944 | A1 * | 9/2008 | Aman | H01G 4/30 501/138 |
| 2012/0050941 | A1 * | 3/2012 | Murakawa | C04B 35/4682 361/321.1 |
| 2012/0238438 | A1 * | 9/2012 | Endo | C04B 35/4682 501/1 |
| 2013/0222968 | A1 * | 8/2013 | Koga | H01G 4/1227 501/137 |

FOREIGN PATENT DOCUMENTS

JP    2009161417 A    7/2009

* cited by examiner

*Primary Examiner* — Arun Ramaswamy
(74) *Attorney, Agent, or Firm* — ArentFox Schiff LLP

(57) ABSTRACT

A dielectric ceramic that includes multiple crystal grains, each of the multiple crystal grains having an interface, a barium titanate ($BaTiO_3$)-based compound as a main component thereof, and a rare earth element. The dielectric ceramic has a cross-section in which the multiple crystal grains has a concentration varying region, a high concentration region, and a low concentration region. The concentration varying region has an RE/Ti ratio differing by 3% or more. The high concentration region has an RE/Ti ratio of 5% to 20%. The low concentration region has an RE/Ti ratio of 0% to 2%.

9 Claims, 4 Drawing Sheets

DIELECTRIC CERAMIC AND MULTILAYER CERAMIC CAPACITOR

CROSS REFERENCE TO RELATED APPLICATIONS

The present application is based on and claims priority to Japanese Patent Application No. 2020-179755, filed on Oct. 27, 2020, the entire contents of which are incorporated herein by reference.

BACKGROUND OF THE INVENTION

Field of the Invention

The present invention relates to a dielectric ceramic and a multilayer ceramic capacitor.

Related Art

Smaller electronic devices such as cellar phones and faster CPUs have increased the demand for multilayer ceramic capacitors (MLCCs). Multilayer ceramic capacitors have a structure in which dielectric layers and internal electrodes are alternately stacked, and even in a small size, they have high capacitance due to their thin layers of a dielectric material with a high permittivity. Among known multilayer ceramic capacitors produced using various materials, a multilayer ceramic capacitor including: dielectric layers containing a barium titanate ($BaTiO_3$)-based material; and internal electrodes of a base metal, such as nickel (Ni), is widely used due to its low price and high performance.

As multilayer ceramic capacitors have been required to have high capacitance, their dielectric layers have been made thinner. As dielectric layers are made thinner, the intensity of the electric field applied per layer increases. If a high electric field is applied to a barium titanate ($BaTiO_3$)-based dielectric layer in a high-temperature environment, a problem may arise in that oxygen vacancies move in $BaTiO_3$ to reduce the insulation resistance. The reduction in insulation resistance is undesirable because it degrades the high temperature load life and the capacitor reliability.

To solve such a problem, a multilayer ceramic capacitor having a core-shell structure has been proposed. Such a core-shell structure contains a rare earth element solid solution in a surface portion (shell) of $BaTiO_3$ crystal grains, which constitute a dielectric layer. The rare earth element solid solution can be formed by a process that includes mixing $BiTiO_3$ with a rare earth element compound; then shaping the mixture and internal electrodes into a certain form for a multilayer ceramic capacitor; and firing the shaped product. The rare earth element solid solution is thought to suppress the movement of oxygen vacancies and thus to increase the reliability (durability).

For example, Patent Document 1 discloses such technology. Patent Document 1 discloses a dielectric ceramic composition that is suitable for use in multilayer ceramic capacitors, includes barium titanate as a main component, and includes surface diffusion particles including a central portion and a diffusive phase being around the core portion and including at least Zr, Mg, and R, wherein R is, for example, Sc, Y, or La (see claim 1 in Patent Document 1). Patent Document 1 further discloses that, when dielectric particles have the surface diffusion structure, the DC current applied will flow through the diffusive phase with a low permittivity so that the reduction in insulation resistance can be suppressed, and the core portion exhibiting ferroelectricity can provide high specific permittivity (see claim 1 and paragraph [0035] in Patent Document 1).

Patent Document 1: Japanese Unexamined Patent Application, Publication No. 2009-161417

SUMMARY OF THE INVENTION

The use of multilayer ceramic capacitors in a wider variety of applications has increased the demand for the improvement of their reliability. To meet the demand, the rare earth element (RE) content may be increased to improve the reliability. To form a rare earth element solid solution at a high concentration in barium titanate ($BaTiO_3$), it is necessary to carry out firing at a relatively high temperature or in a reducing atmosphere.

As a result of investigation, however, the present inventors have found that firing at a high temperature or in a reducing atmosphere causes $BaTiO_3$ grain growth and expands the rare earth element solid solution area. The expansion of the solid solution area allows a region with a low rare earth element concentration to exist over a large area, resulting in degradation of the capacitance-temperature characteristics of the capacitor.

The present inventors have conducted intensive studies in light of such problems. As a result, the present inventors have found that a dielectric ceramic including a barium titanate compound as a main component, having multiple regions each with a specific rare earth element concentration in its crystal grain, and having a rare earth element concentration gradient limited in a specific range can form a capacitor with high permittivity, high reliability, and excellent capacitance-temperature characteristics.

The present invention has been completed based on such findings, and an object of the present invention is to provide a dielectric ceramic capable of forming a capacitor with high permittivity, high reliability, and excellent capacitance-temperature characteristics, and to provide a multilayer ceramic capacitor including such a dielectric ceramic.

The present invention encompasses the following aspects. As used herein, the word "to" indicates that the range expressed using the word "to" includes each end value. Specifically, "X to Y" has the same meaning as "X or more and Y or less".

According to an aspect of the present invention, there is provided a dielectric ceramic including: a plurality of first crystal grains, each of the plurality of first crystal grains having an interface, a barium titanate ($BaTiO_3$)-based compound as a main component thereof, and a rare earth element (RE), wherein, in a cross-section of the dielectric ceramic, each of the plurality of first crystal grains have a concentration varying region, a high concentration region, and a low concentration region, the concentration varying region including a first segment between two points having RE/Ti ratios differing by 3% or more, wherein the RE/Ti ratios are a ratio of the molar concentration of the rare earth element to the molar concentration of titanium, the two points being along a cross-sectional straight line passing through an inner portion of a respective first crystal grain of the plurality of first crystal grains from the interface around the respective first crystal grain, the high concentration region including a second segment between the interface and an interface-side point of the two points along the cross-sectional straight line and having an RE/Ti ratio of 5% to 20%, the low concentration region including a third segment that extends from a second of the two points toward the inner portion of the respective first crystal grain along the cross-sectional straight line and having an RE/Ti ratio of 0% to 2%.

According to another aspect of the present invention, there is provided a multilayer ceramic capacitor including: a multilayer body including multiple dielectric layers and multiple internal electrodes, the dielectric layers and the internal electrodes being stacked alternately; and external electrodes on end surfaces of the multilayer body and electrically connected to portions of the internal electrodes extending to the end surfaces, the dielectric layers each including the dielectric ceramic defined above, the cross-section being along the direction in which the dielectric layers are stacked.

The present invention makes it possible to provide a dielectric ceramic capable of forming a capacitor having high permittivity, high reliability, and excellent capacitance-temperature characteristics and to provide a multilayer ceramic capacitor including such a dielectric ceramic.

DETAILED DESCRIPTION OF THE INVENTION

Figure 1:
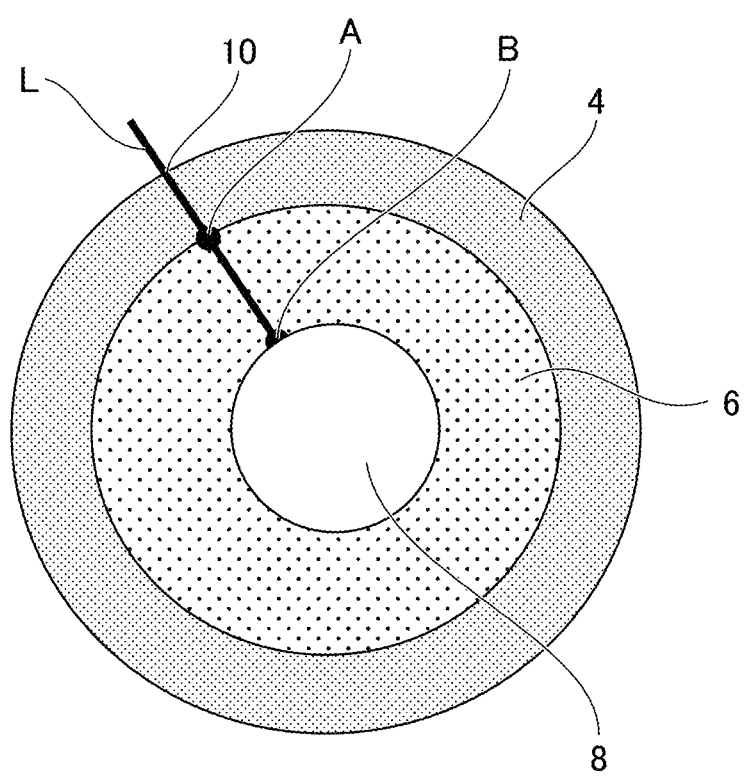
FIG. 1 is a schematic cross-sectional view showing a first crystal grain according to an embodiment of the present invention.

Specific embodiments of the present invention (hereinafter, referred to as "present embodiments") will be described. It should be noted that the embodiments shown below are not intended to limit the present invention and may be altered or modified in various ways without departing from the gist of the present invention.

<Dielectric Ceramic>

A dielectric ceramic according to the present embodiment includes a barium titanate ($BaTiO_3$)-based compound as a main component and a rare earth element (RE). The dielectric ceramic has multiple crystal grains and interfaces between the multiple crystal grains. The dielectric ceramic has a cross-section in which the multiple crystal grains include first crystal grains each including barium (Ba), titanium (Ti), and the rare earth element (RE). Each of the first crystal grains has a concentration varying region, a high concentration region, and a low concentration region. The concentration varying region includes a segment between two points having RE/Ti ratios differing by 3% or more, wherein the RE/Ti ratio is the ratio of the molar concentration of the rare earth element (RE) to the molar concentration of titanium (Ti), and the two points are along a cross-sectional straight line passing through an inner portion of the first crystal grain from the interface around the first crystal grain. The high concentration region includes a segment between the interface and an interface-side point of the two points along the cross-sectional straight line and has an RE/Ti ratio of 5% to 20%. The low concentration region includes a segment that extends from a second of the two points toward an inner portion of the first crystal grain along the cross-sectional straight line and has an RE/Ti ratio of 0% to 2%. This ceramic will be described in detail below.

The dielectric ceramic includes a barium titanate ($BaTiO_3$)-based compound as a main component. The dielectric ceramic including a $BaTiO_3$-based compound can have a high permittivity. $BaTiO_3$ is a perovskite compound represented by the general formula: $ABO_3$. The A-site of the perovskite structure is a 12-coordination site, and the B-site thereof is a 6-coordination site. In the compound, barium (Ba) forms a positive divalent ion ($Ba^{2+}$) with a relatively large ionic radius and occupies the A-site. Titanium (Ti) forms a positive tetravalent ion ($Ti^{4+}$) with a relatively small ionic radius and occupies the B-site. At room temperature, $BaTiO_3$ has a tetragonal crystal system with a non-centrosymmetric unit cell. Specifically, $Ti^{4+}$ occupying the B-site is dislocated to generate intrinsic polarization. The direction of the polarization can be easily changed by an external electric field. Therefore, $BaTiO_3$ is a ferroelectric having a high permittivity at room temperature. As used herein, the term "main component" refers to a component with the highest content in the ceramic. The content of the main component may be 50% by mass or more, 60% by mass or more, 70% by mass or more, 80% by mass or more, or 90% by mass or more.

The barium titanate ($BaTiO_3$)-based compound contained as a main component may be any perovskite oxide containing barium (Ba) and titanium (Ti). That is, the compound may be $BaTiO_3$ or a modification of $BaTiO_3$ containing any other element partially substituted for Ba and/or Ti. Specifically, Ba may be partially replaced with Sr and/or Ca or may not be replaced. Ti may be partially replaced with Zr and/or Hf or may not be replaced. The $BaTiO_3$ compound does not strictly have to have a ratio of the A-site element (such as Ba, Sr, or Ca) to the B-site element (such as Ti, Zr, or Hf) of 1:1. The ratio of the A-site element to the B-site element may vary as long as the perovskite crystal structure is preserved.

The dielectric ceramic includes a rare earth element (RE). As used herein, the term "rare earth element" (RE) is a generic term including elements belonging to the group consisting of scandium (Sc) (atomic number 21), yttrium (Y) (atomic number 39), and elements from atomic number 57 (lanthanum (La)) to atomic number 71 (lutetium (Lu)) in the periodic table. The dielectric ceramic may include only one rare earth element or may include a combination of multiple rare earth elements. The rare earth element only has to be contained at least in main component grains. The rare earth element may be contained in only main component grains or in main component grains and a grain boundary phase or a triple point. The rare earth element in the main component grains may occupy the Ba-site (A-site), Ti-site (B-site), or both sites of the $BaTiO_3$-based compound.

The doping of the dielectric ceramic with the rare earth element (RE) allows control of its various properties. In $BaTiO_3$, $Ba^{2+}$ with a large ionic radius occupies the A-site, while $Ti^{4+}$ with a small ionic radius occupies the B-site. In general, the rare earth element forms a positive trivalent ion ($RE^{3+}$) with an ionic radius whose size is between the size of $Ba^{2+}$ and the size of $Ti^{4+}$. Therefore, the rare earth element forms a solid solution in $BaTiO_3$ and is substituted for one or both of Ba and Ti. The rare earth element acts as a donor when it forms a solid solution in the Ba-site (A-site), while the rare earth element acts as an acceptor when it forms a solid solution in the Ti-site (B-site). The doping with the rare earth element having such functions can change the nature of the dielectric ceramic.

In particular, the doping with the rare earth element (RE) improves the high temperature load life and increases the reliability. In the $BaTiO_3$-based dielectric ceramic, the main component grains contain a large amount of oxygen vacancies, which have been formed in the firing process. The oxygen vacancies have a positive charge and form a passage through which charges pass. A large amount of oxygen vacancies can increase the amount of charge transfer and is more likely to cause the degradation of insulation resistance. In particular, in a high-temperature environment, oxygen vacancies tend to move to the vicinity of the negative electrode. Therefore, under a load, the amount of oxygen vacancies may locally increase on the negative electrode side to cause the degradation of insulation resistance. On the other hand, the doping of $BaTiO_3$ with the rare earth element, which acts as a donor and/or acceptor, can suppress the formation and movement of oxygen vacancies. Specifically, when the rare earth element forms a solid solution in the Ba-site of $BaTiO_3$, Ba deficiency occurs, and the amount of oxygen vacancies decreases. The Ba deficiency is less likely to move. The Ba deficiency, which is less likely to move, is considered to form a cluster with oxygen vacancies to suppress the movement of oxygen vacancies. These factors may act in a combined way to increase the dielectric insulation and to improve the high temperature load life.

Moreover, the doping with the rare earth element (RE) improves the temperature characteristics of the permittivity. Pure $BaTiO_3$, which has a tetragonal crystal system at room temperature, undergoes phase transition at about 125° C. and, at a temperature higher than that, has a cubic crystal system, which is paraelectric. Pure $BaTiO_3$ also undergoes phase transition at about 0° C. and has a monoclinic crystal system at a temperature lower than that. $BaTiO_3$, which undergoes phase transition near room temperature, shows a significant temperature-dependent change in permittivity since the permittivity has a peak around the phase transition temperature.

On the other hand, appropriate doping of the $BaTiO_3$-based dielectric ceramic with the rare earth element (RE) makes it possible to form crystal grains having a core-shell structure. The crystal grain having a core-shell structure includes a surface portion (shell) with a high rare earth element concentration and a core portion (core) with a low rare earth element concentration. The core has a composition close to that of pure $BaTiO_3$ and has a high permittivity. On the other hand, the shell includes a $BaTiO_3$ solid solution containing the rare earth element in the Ba-site and/or the Ti-site and shows a temperature-dependent change in permittivity, which differs from that for the core. Since the temperature-dependent change in permittivity differs between the core and the shell, the temperature-dependent change in the permittivity of the dielectric ceramic having a core-shell structure can be flat as a whole.

The main component compound of the dielectric ceramic preferably has a composition represented by the general formula: $[(Ba_{1-x1-x2}Sr_{x1}Ca_{x2})O]_m[(Ti_{1-y1-y2}Zr_{y1}Dy_{y2})O_2]$. Such a composition can provide a higher level of properties such as a higher permittivity.

The dielectric ceramic contains multiple crystal grains and interfaces between the crystal grains. In other words, the dielectric ceramic is a sintered body including polycrystalline grains. The interface between the crystal grains may also be referred to as a grain boundary. The dielectric ceramic also has a cross-section in which multiple crystal grains include first crystal grains each containing barium (Ba), titanium (Ti), and the rare earth element (RE). As used herein, the term "cross-section" refers to a section along the thickness direction of the dielectric ceramic. Namely, the axis normal to the cross-section is perpendicular to the thickness direction of the dielectric ceramic. For example, when the dielectric ceramic forms a dielectric layer in a multilayer ceramic capacitor, the cross-section corresponds to the LT or WT plane.

FIG. 1 is a schematic cross-sectional view showing a first crystal grain according to an embodiment of the present invention. The first crystal grain 2 includes a concentration varying region 6, a high concentration region 4, and a low concentration region 8. The concentration varying region 6 includes a segment between two points (A and B in the drawing) having RE/Ti ratios differing by 3% or more, which are along a straight line (cross-sectional straight line (L)) passing through the interior of the first crystal grain from the interface 10 around the first crystal grain 2. In other words, the concentration varying region 6 is a region significantly varying in rare earth element concentration (RE/Ti ratio) along the cross-sectional straight line (L), in which the rare earth element concentration varies by at least 3%. The high concentration region 4 includes a segment between the interface 10 and an interface-side point (point A) of the two points along the cross-sectional straight line L and has an RE/Ti ratio of 5% to 20%. In other words, the high concentration region 4 is a region that is located substantially outside the concentration varying region 6 and has a relatively high rare earth element concentration (5% to 20%). The low concentration region 8 includes a segment that extends from the second point (point B) of the two points toward an inner portion of the first crystal grain along the cross-sectional straight line L and has an RE/Ti ratio of 0% to 2%. In other words, the low concentration region 8 is a region that is located substantially inside the concentration varying region 6 and has a relatively low rare earth element concentration (0% to 2%). The low concentration region 8 does not have to contain the rare earth element.

The first crystal grain 2 may include the high concentration region 4 in its outer portion, the concentration varying region 6 in its inner portion, and the low concentration region 8 in its further inner portion. In other words, the first crystal grain 2 may have a three-layer structure including the high concentration region 4, the concentration varying region 6, and the low concentration region 8 arranged in order from outside to inside. It should be noted that the high concentration region 4 does not always have to be located at the center of the first crystal grain 2. The high concentration region 4 may have a center different from the center of the first crystal grain 2. The first crystal grain 2 only has to contain at least one high concentration region 4. That is, the first crystal grain 2 may contain one high concentration region 4 or two or more high concentration regions 4.

In the concentration varying region 6, variations of less than 3% in the rare earth element concentration (RE/Ti ratio) along the cross-sectional straight line are too small. In such a case, the rare earth element solid solution region may have a large area in the crystal grain to degrade the temperature characteristics of the permittivity. The variations in the rare earth element concentration are preferably 5% or more and more preferably 7% or more. The variations in the rare earth element concentration may have any upper limit. However, the variations in the rare earth element concentration preferably have an upper limit of 30% or less in order to provide better properties, such as high permittivity. As the rare earth element forms a solid solution, the crystal lattice of the $BaTiO_3$-based compound changes its dimensions. This is because a region formed to have excessively large variations in concentration may have large variations in lattice dimensions, on which stress may concentrate.

When the rare earth element concentration monotonically increases or decreases along the cross-sectional straight line, an RE/Ti ratio gradient per unit length may also be defined (rare earth element concentration gradient). In this case, the RE/Ti ratio gradient per unit length along the cross-sectional straight line passing through the concentration varying region (rare earth element concentration gradient) is preferably 0.05%/nm to 1.00%/nm. The rare earth concentration gradient indicates the degree of change in the rare earth element concentration of the concentration varying region. If the rare earth concentration gradient is excessively small, there may be a large rare earth element solid solution region, which may degrade the temperature characteristics of the permittivity. The rare earth element concentration gradient may be 0.07%/nm or more or 0.09%/nm or more.

The high concentration region along the cross-sectional straight line has a molar ratio (RE/Ti ratio) of the concentration of the rare earth element (RE) to the concentration of titanium (Ti) of 5% to 20%. If the amount of the rare earth element in the high concentration region is excessively small, the core-shell structure may be less likely to form, and the reliability or the temperature characteristics of the permittivity may degrade. On the other hand, if the amount of the rare earth element in the high concentration region is excessively large, the rare earth element may be incorporated in the core so that the core-shell structure may also be less likely to form.

The low concentration region along the cross-sectional straight line has an RE/Ti ratio of 0% to 2%. The low concentration region may or may not include the rare earth element. When the low concentration region contains the rare earth element, the rare earth element concentration is limited to 2% or less. If the amount of the rare earth element in the low concentration region is excessively large, the core-shell structure may be less likely to form, and the reliability and the temperature characteristics of the permittivity may fail to improve.

Having a specific rare earth element concentration distribution in the crystal grain as described above, the resulting dielectric ceramic has high permittivity, excellent reliability, and excellent temperature characteristics of permittivity. Such a dielectric ceramic is suitable for use as a dielectric material in single plate capacitors, multilayer ceramic capacitors, or electronic substrates, and is particularly suitable for dielectric layers in multilayer ceramic capacitors. This is because such a dielectric ceramic undergoes less degradation of reliability and temperature characteristics of permittivity even when it is formed into a thin layer. Moreover, a multilayer ceramic capacitor including such a ceramic has a high permittivity and undergoes less temperature-dependent changes in capacitance. Furthermore, such a multilayer ceramic capacitor is advantageous in that it has excellent reliability even at high temperature and high electric field.

The rate of change in the permittivity (capacitance) may be evaluated as follows. First, according to the procedure described later, a multilayer ceramic capacitor including the dielectric ceramic is prepared and then used as a sample for evaluation. Specifically, the sample is heated under conditions at 150° C. for 1 hour and then allowed to stand at room temperature for 24 hours. Subsequently, the sample is placed in a thermostatic chamber and measured for capacitance under conditions at 1 kHz and 1 V while the temperature is changed in the range of −55° C. to +135° C. The rate of change in capacitance at each temperature is then calculated based on the capacitance at 25° C. as a reference. The sample is determined to be acceptable if it satisfies the X7S characteristics. The multilayer ceramic capacitor including the dielectric ceramic according to the embodiment is, for example, so excellent in capacitance-temperature characteristics that its 100 samples are all determined to be acceptable. In this regard, the permittivity may be calculated from the thickness and area of the dielectric ceramic and the capacitance.

The reliability may be evaluated as follows. First, the sample is subjected to an accelerated reliability test in which the mean time to failure (MTTF) is determined. Specifically, a DC voltage of at least 25 kV/mm is applied to the sample at a temperature of 150° C. while its lifetime is measured. In the measurement of the lifetime, the time to failure is determined as the time period from the start of voltage application until the insulation resistance decreases by one order of magnitude, and the mean time to failure is calculated by Weibull analysis of the time to failure. The sample is determined to be acceptable if it has a mean time to failure of more than 50 hours. The multilayer ceramic capacitor including the dielectric ceramic according to the embodiment is so excellent in reliability that its 100 samples are all determined to be acceptable.

Preferably, in the cross-section of the dielectric ceramic, the first crystal grain has a high concentration region area ratio of 3% to 60%, a low concentration region area ratio of 10% to 40%, and a concentration varying region area ratio of 5% to 20%. When the area ratio of each region falls within the above range, the ratio between the core and the shell can be adjusted in a well-balanced manner. Thus, the core and the shell can fully exert their functions to provide further improved reliability and temperature characteristics of permittivity with less reduction in permittivity. The area ratio of the high concentration region is more preferably 3% to 50%. The area ratio of the low concentration region is more preferably 30% to 40%. The area ratio of the concentration varying region is more preferably 5% to 10%. The total area ratio is 100%.

Figure 2:
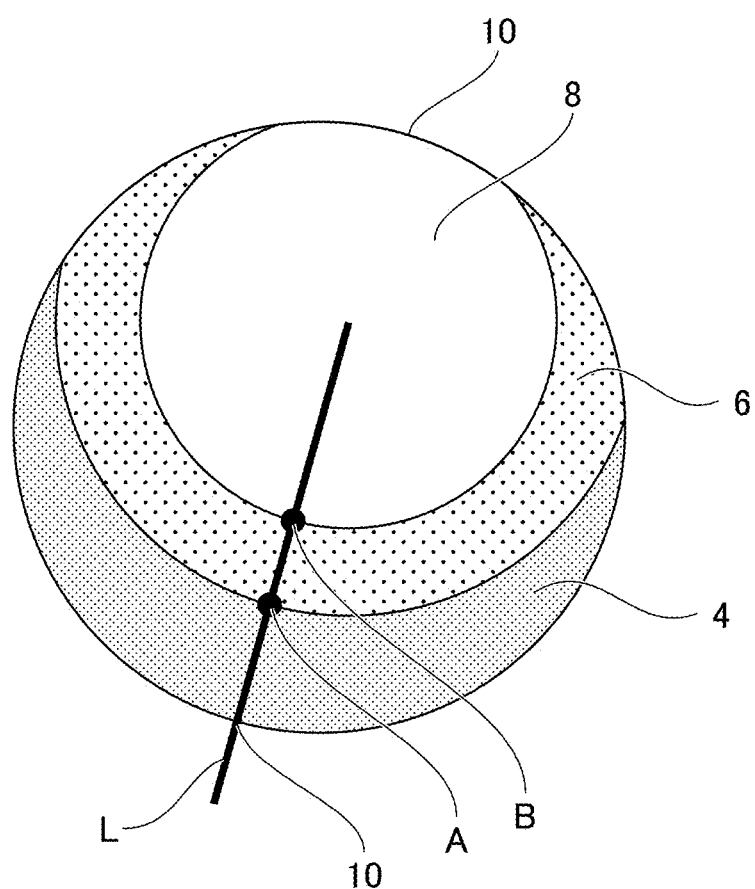
FIG. 2 is a schematic cross-sectional view showing a first crystal grain according to another embodiment of the present invention.

Preferably, in the cross-section of the dielectric ceramic, at least part of the low concentration region of the first crystal grain is in contact with the interface around the first crystal grain. An example of such a mode is shown in FIG. 2. In the interior of the first crystal grain 2, the low concentration region 8 is in direct contact with the interface 10 without the high concentration region 4 and the concentration varying region 6 in between the low concentration region 8 and the interface 10. Such a structure can suppress the degradation of reliability or temperature characteristics of permittivity, which would otherwise be associated with the process of forming the dielectric ceramic into a thin layer.

Preferably, in the cross-section of the dielectric ceramic, the high concentration region is located at a distance of 0 nm to 200 nm inside from the interface around the first crystal grain. Preferably, in the cross-section of the dielectric ceramic, the high concentration region is located at a distance of 0 nm or more and ⅓ of the grain diameter or less inside from the interface around the first crystal grain. The high concentration region located in the limited area mentioned above can provide more stable temperature characteristics.

Figure 3:
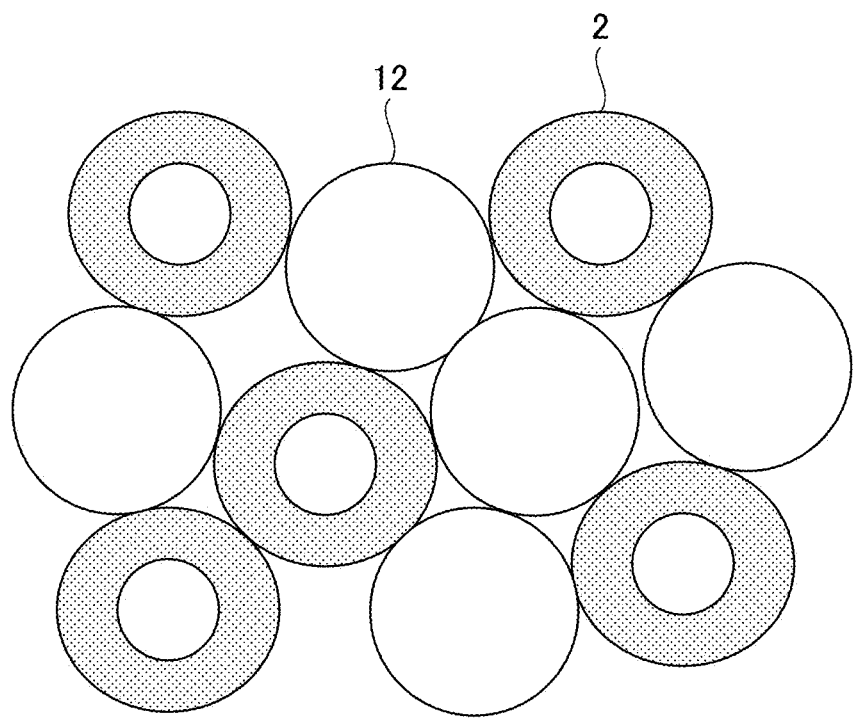
FIG. 3 is a view showing a mixed phase of first and second crystal grains according to an embodiment of the present invention.

Preferably, in the cross-section of the dielectric ceramic, the multiple crystal grains further include second crystal grains each including barium (Ba) and titanium (Ti). The second crystal grains each have an RE/Ti ratio of 3% or less. An example of such a mode is shown in FIG. 3. The dielectric ceramic has a mixed phase including: first crystal grains 2 each having a core-shell structure; and second crystal grains 12 each being low in rare earth element content or containing no rare earth element. The ceramic with such a mixed phase can provide both high reliability and excellent temperature characteristics of permittivity even when it is formed into a thin layer.

Preferably, the cross-section of the dielectric ceramic has a first crystal grain area ratio of 70% to 100% and a second crystal grain area ratio of 0% to 30%. The first and second crystal grains with area ratios adjusted in the above ranges can maintain a higher level of reliability and temperature characteristics of permittivity.

The dielectric ceramic preferably has an overall RE/Ti ratio of 3% to 13%. As used herein, the term "overall RE/Ti ratio" refers to the molar ratio of the concentration of the rare earth element (RE) to the concentration of titanium (Ti) in the whole of the dielectric ceramic including crystal grains and interfaces. When the RE/Ti ratio is at a certain high level, the doping with the rare earth element will be sufficiently effective in preventing the degradation of reliability and temperature characteristics of permittivity. Also, when the RE/Ti ratio is at a certain high level, crystal grain growth can be suppressed, which is preferred in the process of forming the dielectric ceramic into a thin layer. If the concentration of the rare earth element (RE) is as high as more than 13%, segregation may occur to reduce the insulation resistance value.

The rare earth element (RE) is preferably one or more elements selected from the group consisting of dysprosium (Dy), gadolinium (Gd), holmium (Ho), yttrium (Y), and lanthanum (La), and is more preferably dysprosium (Dy). Dysprosium (Dy) is an element located near the middle position in the lanthanoid series in the periodic table. Its ionic radius is also a middle level among the lanthanoid elements. Therefore, it can form a solid solution in both the Ba-site and Ti-site of $BaTiO_3$, which is effective in improving the reliability. The dielectric ceramic may include only dysprosium as a rare earth element.

Preferably, the dielectric ceramic further includes at least one element selected from the group consisting of magnesium (Mg), manganese (Mn), silicon (Si), and nickel (Ni). The doping with these elements can further improve characteristics including permittivity, reliability, and temperature characteristics of permittivity. For example, magnesium (Mg) acts to suppress the crystal grain growth and to facilitate the formation of the core-shell structure. In this regard, these elements may form a solid solution in the crystal grains or may exist in the form of an oxide at the grain boundary or the triple point. These elements may form a crystalline or glass component.

The dielectric ceramic may include elements other than those shown above. Such elements include aluminum (Al), lithium (Li), niobium (Nb), and/or cobalt (Co). These elements may form a solid solution in the crystal grains or may exist in the form of an oxide at the grain boundary or the triple point. These elements may form a crystalline or glass component.

<Multilayer Ceramic Capacitor>

A multilayer ceramic capacitor according to an embodiment of the present invention includes a multilayer body including multiple dielectric layers and multiple internal electrodes, which are alternately stacked; and external electrodes provided at end surfaces of the multilayer body. The external electrodes are electrically connected to portions of the internal electrodes extending to the end surfaces. The external electrodes are configured to electrically sandwich the dielectric layers via the internal electrodes in between the external electrodes. Such configuration allows the capacitive element to function.

Figure 4:
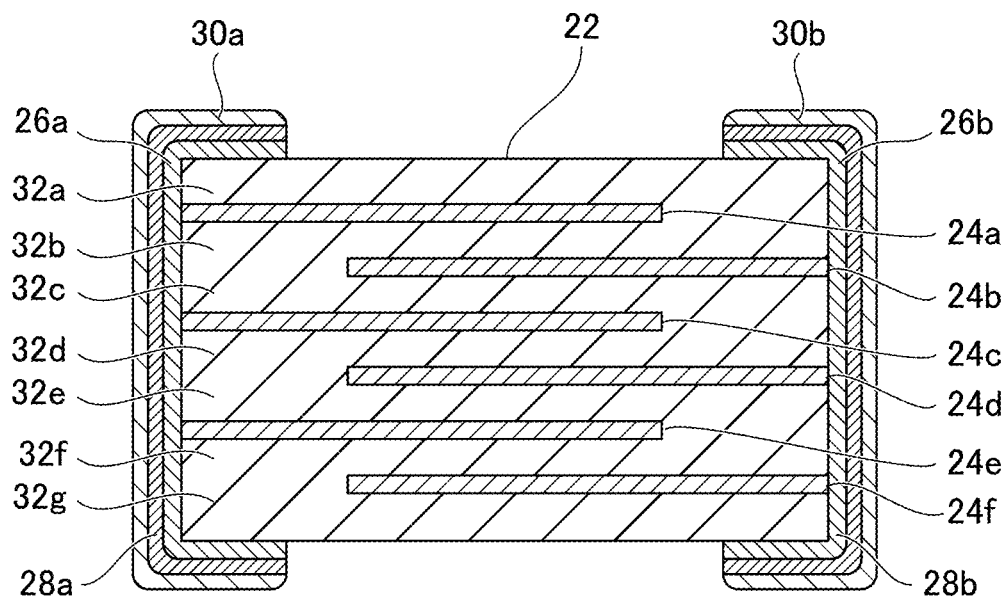
FIG. 4 is a schematic cross-sectional view showing a multilayer ceramic capacitor according to an embodiment of the present invention.

The structure of the multilayer ceramic capacitor will be described with reference to FIG. 4. FIG. 4 is a schematic cross-sectional view showing an example of the multilayer ceramic capacitor. The multilayer ceramic capacitor 20 includes a multilayer body 22 including a sintered material in which internal electrodes 24a to 24f are embedded; external electrodes 26a and 26b provided at both end surfaces of the multilayer body 22; and first plating films 28a and 28b and second plating films 30a and 30b provided on the surfaces of the external electrodes 26a and 26b.

That is, the multilayer body 22 is a sintered body produced by alternately stacking the dielectric layers 32a to 32g and the internal electrodes 24a and 24f and firing the stack. The internal electrodes 24a, 24c, and 24e are electrically connected to one external electrode 26a, and the internal electrodes 24b, 24d, and 24f are electrically connected to the other external electrode 26b. A capacitance is formed between the facing surfaces of the internal electrode 24a, 24c, or 24e and the internal electrode 24b, 24d, or 24f.

The multilayer ceramic capacitor 20 has a substantially rectangular parallelepiped shape as a whole and includes a multilayer body 22 and a pair of opposed external electrodes 26a and 26b. As used herein, the term "substantially rectangular parallelepiped" is intended to include not only rectangular parallelepiped but also modified rectangular parallelepiped shapes with rounded sides or corners. The longitudinal direction L of the multilayer ceramic capacitor 20 is defined as the direction in which the pair of external electrodes 26a and 26b face each other. The thickness direction T is defined as the direction in which the dielectric layers 32a to 32g and the internal electrodes 24a to 24f are stacked. The width direction W is defined as the direction perpendicular to both of the longitudinal direction L and the thickness direction T. The plane defined by the longitudinal direction L and the thickness direction T is called the LT plane, and the plane defined by the width direction W and the thickness direction T is called the WT plane.

The dielectric layers of the multilayer ceramic capacitor each include the dielectric ceramic described above. The cross-section of the dielectric ceramic is along the direction in which the dielectric layers are stacked. Namely, the axis normal to the cross-section is perpendicular to the direction in which the dielectric layers are stacked. The cross-section may correspond to the LT plane or the WT plane. The dielectric layer including the dielectric ceramic described above can maintain a high level of reliability and capacitance-temperature characteristics even when it is made thinner. That makes it possible to provide a multilayer ceramic capacitor having excellent capacitance-temperature characteristics and excellent reliability.

Preferably, the dielectric layers each have a thickness of 1.3 μm to 4.3 μm. Preferably, the internal electrodes each have a thickness of 0.5 μm to 1.0 μm.

<Method of Producing Multilayer Ceramic Capacitor>

Next, a method of producing a multilayer ceramic capacitor will be described. The production method includes preparing a main component powder (preparation step); mixing the main component powder with a subcomponent powder (mixing step); calcining the resulting mixture to form a calcined powder (calcination step); mixing the resulting calcined powder with a subcomponent powder to form a dielectric powder (dielectric powder preparation step); adding a binder and a solvent to the dielectric powder, mixing them to form a slurry, and shaping the resulting slurry into a green sheet (shaping step); using an internal electrode-forming conductive paste to form a patterned conductive paste layer on the surface of the green sheet (conductive paste layer forming step); stacking multiple green sheets each provided with the conductive paste layer and pressure bonding the green sheets to form a multilayer block (stacking step); cutting the resulting multilayer block into green multilayer chips (cutting step); subjecting the resulting green multilayer chips to binder removal and firing to form multilayer chips (multilayer bodies) (firing step); and forming external electrodes on each of the resulting multilayer chips (external electrode forming step). Each step will be described in detail below.

In the preparation step, a Ba compound and a Ti compound are provided as raw materials for a main component powder, and optionally, a Sr compound, a Ca compound, a Zr compound, and a Hf compound are provided. A main component powder is then synthesized from these raw materials. Each raw material compound may be a known ceramic raw material, such as an oxide, a carbonate, a hydroxide, a nitrate, an organic acid salt, an alkoxide and/or a chelate compound. The synthesis method may also be a known ceramic synthesis method, such as a solid phase reaction method, a hydrothermal synthesis method, or an alkoxide method.

For example, the synthesis by a solid phase reaction method includes wet-mixing and wet-pulverizing the weighed raw materials for the main component powder, a medium for pulverization, and pure water using a ball mill; drying the mixture; and heating the dried mixture at a temperature of 950° C. to 1,150° C. to form a main component powder including a $BaTiO_3$-based compound. Alternatively, the main component powder may be pulverized after it is heated.

Subsequently, the crystallinity of the main component powder is analyzed, and the main component powder is divided into a high-crystallinity main component powder fraction and a low-crystallinity main component powder fraction. Both fractions are then mixed, and a specific amount of the mixture is weighed.

In the mixing step, a subcomponent powder is mixed with the main component powder to form a mixture. The subcomponent powder may include such compounds as an RE compound, a Mg compound, a Mn compound, and a Si compound. The subcomponent compound may be a known ceramic raw material, such as an oxide, a carbonate, a hydroxide, a nitrate, an organic acid salt, an alkoxide, and/or a chelate compound. In order to further adjust the Ba/Ti ratio, a Ba compound or a Ti compound may be further added to the main component powder and the subcomponent powder. The materials may be mixed by any method. For example, the mixing method may include wet-mixing and wet-pulverizing the weighed main component powder, the weighed subcomponent powder, optionally a Ba compound and/or a Ti compound, and a medium for pulverization, and pure water using a ball mill.

In the calcination step, the resulting mixture is calcined to form a calcined powder. The calcination may include, for example, holding the mixture under conditions at a temperature of 400° C. to 800° C. for 1 to 4 hours in the air.

In the dielectric powder preparation step, the resulting calcined powder is mixed with a subcomponent powder including, for example, a RE compound, a Mg compound, a Mn compound, and a Si compound.

In the shaping step, a binder and a solvent are added to and mixed with the resulting dielectric powder to form a slurry, and the resulting slurry is shaped into a green sheet. The binder may be a known organic binder, such as a polyvinyl butyral binder. The solvent may be a known organic solvent, such as toluene or ethyl alcohol. If necessary, other additives, such as a plasticizer, may be added. The slurry may be shaped by a known method, such as a LIP method.

In the conductive paste layer forming step, an internal electrode-forming conductive paste is used to form a patterned conductive paste layer on the surface of the green sheet. The conductive paste may contain any electrically-conductive material. For low cost, the electrically-conductive material is preferably a base metal material including Ni, Cu, or an alloy thereof as a main component. The conductive paste layer may be formed by any method. For example, the conductive paste layer may be formed by such a technique as screen printing.

In the stacking step, multiple green sheets provided with the conductive paste layer are stacked and pressure bonded to form a multilayer block. If necessary, a green sheet with no conductive paste layer may be placed on the multilayer block. The number of the green sheets to be stacked may be adjusted to achieve the desired capacitance. For example, it may be set to 100 to 1300.

In the cutting step, the resulting multilayer block is cut into green multilayer chips. The cutting may be performed such that chips with a predetermined size are obtained and the conductive paste layer is partially exposed at the end surface of the multilayer chip.

In the firing step, the resulting green multilayer chips are subjected to binder removal and firing to give multilayer chips (multilayer bodies). In the firing, the conductive paste layers and the ceramic green sheets are co-fired to form a multilayer body having embedded internal electrodes. The conditions for the binder removal may be determined depending on the type of the organic binder in the green sheet and the conductive paste layer. The firing may be carried out at a temperature that allows sufficient densification of the multilayer chip. For example, the firing may be carried out under conditions at a temperature of 1,000° C. to 1,200° C. for 1 to 10 hours. The firing is performed in an atmosphere in which the reduction reaction of the barium titanate-based compound as a main component is prevented and the oxidation of the conductive material is inhibited. For example, the firing may be performed in a $N_2$—$H_2$-$H_2O$ flow with an oxygen partial pressure of $0.5 \times 10^{-9}$ MPa to $3.0 \times 10^{-9}$ MPa.

In the external electrode forming step, external electrodes are formed on each resulting multilayer chip. The external electrodes may be formed by applying an external electrode-forming conductive paste, which is based on a conductive component such as Cu or Ag, to the exposed end surface of an extending portion of the internal electrode of the multilayer chip and baking the paste. Alternatively, the external electrode may be formed by a process that includes applying a conductive paste to both end surfaces of the green multilayer chip; and then firing the green multilayer chip. Finally, the product is subjected to electrolytic plating to form a plating film of Ni, Sn, Cu, or an alloy thereof on the surface of the external electrode. The multilayer ceramic capacitor is produced in this way.

It should be noted that the subcomponents added to the main component are not limited to those shown above. Nickel (Ni) or the like may be added to improve reliability and various characteristics including electrical characteristics.

During the process of producing the multilayer ceramic capacitor, Al, Fe, Co, or the like may enter as an impurity and remain in the crystal grains or at the crystal boundaries, but that has no effect on the electrical characteristics of the capacitor. During the firing for the multilayer ceramic capacitor, the internal electrode component may diffuse into the crystal grains or the crystal grain boundaries, but that also has no effect on the electrical characteristics of the capacitor.

Examples (1) Production of Multilayer Ceramic Capacitor

Multilayer ceramic capacitor samples were produced by the procedure shown below.

First, a $BaTiO_3$ powder with a BET diameter of 190 nm and a tetragonality of 1.0099 was provided, which was named BT-A powder. The tetragonality is an index indicating the degree of tetragonal crystal structure, expressed by the ratio of the c-axis length to the a-axis length in the tetragonal crystal structure (c/a axis ratio). The tetragonality can be determined using X-ray diffraction (XRD) method. Separately, a $BaTiO_3$ powder with a BET diameter of 100 nm and a tetragonality of 1.007 was provided, which was named BT-B powder. It was wet pulverized so that a pulverized BT-B powder was obtained. The pulverized BT-B powder had a BET specific surface area of 50 $m^2/g$.

A $Dy_2O_3$ powder was also wet pulverized so that a pulverized $Dy_2O_3$ powder was obtained. The pulverized $Dy_2O_3$ powder had a BET specific surface area of 50 $m^2/g$.

The BT-A powder, the pulverized BT-B powder, the pulverized $Dy_2O_3$ powder, a $BaCO_3$ powder, and a $TiO_2$ powder were mixed in a given ratio using a wet mill and then dried to form a mixed powder.

The resulting mixed powder was subjected to heat treatment including heating it at a temperature ramp rate of 600° C./hr to 1,100° C. in the air and then holding it for 2 hours, so that a calcined powder was obtained.

To the calcined powder were added 1.0 part by mole of a $MgCO_3$ powder, 0.3 parts by mole of a $MnCO_3$ powder, and 1.3 parts by mole of a $SiO_2$ sol based on 100 parts by mole of $TiO_2$ in the calcined powder. The powders were wet mixed and then dried to form a dielectric powder.

A polybutyral-based binder and a plasticizer were added to the resulting dielectric powder. Toluene and ethyl alcohol were added to the mixture and mixed using a wet mill to form a slurry. The slurry was shaped into a green sheet. After being sintered and densified, the resulting green sheet gave a product with a thickness of 1.7 μm.

A nickel-based conductive paste was screen printed on the surface of the resulting green sheet to form a patterned conductive paste layer for forming an internal electrode.

Subsequently, 600 pieces of the green sheet with the conductive paste layer provided on its surface were stacked such that the sides on which the conductive paste layer extended to the end portion were arranged in a staggered manner, and green sheets with no conductive paste layer were placed on the top and bottom of the stack to form a multilayer block.

The resulting multilayer block was cut into green multilayer chips. The cutting was performed such that multilayer ceramic capacitors with a size of 3.2 mm×1.6 mm could be obtained.

The resulting green multilayer chips were heated at 280° C. in a $N_2$ flow so that the binder was burnt away. Subsequently, the multilayer chips were fired for 2 hours under conditions at 1,260° C. and an oxygen partial pressure of $1.6 \times 10^{-9}$ MPa in a $N_2$—$H_2$-$H_2O$ flow.

A copper-based conductive paste was applied to each end portion of each fired multilayer chip, to which the internal electrode extended, and then baked at 800° C. to form external electrodes. A Ni—Sn plating layer was further formed on the surface of each of the external electrodes. Multilayer ceramic capacitors were produced in this way.

(2) Evaluation

The produced samples were evaluated for characteristics. Analysis of Crystal Grains (Re/Ti Ratio)

The RE/Ti ratio in the crystal grains was determined by the procedure shown below. First, the sample including the multilayer body was polished on its LT plane up to the middle in the width direction W to expose a cross section. Subsequently, the cross-section was irradiated with a focused ion beam (FIB) so that small pieces of the cross-section including multiple crystal grains were obtained. The probe of a transmission electron microscope was positioned to analyze the small section piece of the sample and used to measure the concentrations of Ti and the rare earth element in the crystal grains. The RE/Ti ratio at each measurement point was calculated based on the measured concentrations.

<Analysis of Crystal Grains (Area Ratio)>

The area ratio of the crystal grains was determined by the procedure shown below. Specifically, the element concentration distribution in 100 crystal grains was determined using transmission electron microscopy energy dispersive X-ray spectroscopy (TEM-EDX), and the crystal grain area was calculated from the element concentration distribution. The average area was then calculated.

<Relative Permittivity>

The capacitance of the sample was measured using an automatic bridge meter under the conditions: a temperature of 25° C., a frequency of 1 kHz, and an effective voltage of 0.5 Vrms. The relative permittivity was then calculated using the dimensions of the sample and the number of the stacked layers.

EXPLANATION OF REFERENCE NUMERALS

2: First crystal grain
4: High concentration region
6: Concentration varying region
8: Low concentration region
10: Interface
12: Second crystal grain
20: Multilayer ceramic capacitor
22: Multilayer body
24a to 24f: Internal electrode
26a, 26b: External electrode
28a, 28b: First plating film
30a, 30b: Second plating film
32a to 32g: Dielectric layer

What is claimed is:

1. A dielectric ceramic comprising:
    a plurality of first crystal grains, each of the plurality of first crystal grains having an interface, a barium titanate ($BaTiO_3$)-based compound as a main component thereof, and a rare earth element,
    wherein, in a cross-section of the dielectric ceramic, each of the plurality of first crystal grains have a concentration varying region, a high concentration region, and a low concentration region,
    the concentration varying region comprising a first segment between two points having RE/Ti ratios differing by 3% or more, wherein RE/Ti ratios are a molar ratio of a concentration of the rare earth element to a concentration of titanium,
    the two points being along a cross-sectional straight line passing through an inner portion of a respective first crystal grain of the plurality of first crystal grains from the interface around the respective first crystal grain, the high concentration region comprising a second segment between the interface and an interface-side point of the two points along the cross-sectional straight line and having an RE/Ti ratio of 5% to 20%, the low concentration region comprising a third segment that extends from a second of the two points toward the inner portion of the respective first crystal grain along the cross-sectional straight line and having an RE/Ti ratio of 0% to 2%.

2. A multilayer ceramic capacitor comprising:

a multilayer body comprising a plurality of dielectric layers and a plurality of internal electrodes, the dielectric layers and the internal electrodes being stacked alternately; and external electrodes on end surfaces of the multilayer body and electrically connected to portions of the internal electrodes extending to the end surfaces, wherein the dielectric layers each comprising the dielectric ceramic according to claim 1, and the cross-section being along a direction in which the dielectric layers are stacked.

3. The multilayer ceramic capacitor according to claim 2, wherein each of the dielectric layers has a thickness of 1.3 μm to 4.3 μm.

4. The multilayer ceramic capacitor according to claim 2, wherein each of the internal electrodes has a thickness of 0.5 μm to 1.0 μm.

5. The multilayer ceramic capacitor according to claim 2, wherein the concentration varying region has a rare earth element concentration gradient of 0.05%/nm to 1.00%/nm.

6. The multilayer ceramic capacitor according to claim 2, wherein, in the cross-section, the plurality of first crystal grains have a high concentration region area ratio of 3% to 60%, a low concentration region area ratio of 10% to 40%, and a concentration varying region area ratio of 5% to 20%.

7. The multilayer ceramic capacitor according to claim 2, wherein, in the cross-section, at least part of the low concentration region of each of the plurality of first crystal grain is in contact with the interface thereof.

8. The multilayer ceramic capacitor according to claim 2, wherein, in the cross-section, the high concentration region of each of the plurality of first crystal grain is located at a distance of 0 nm to 200 nm inside from the interface thereof.

9. The multilayer ceramic capacitor according to claim 2, wherein the dielectric ceramic further comprises a plurality of second crystal grains, each of the plurality of second crystal grains comprising barium and titanium, and having a RE/Ti ratio of 3% or less.

* * * * *